United States Patent [19]

Dautartas et al.

[11] Patent Number: 4,946,236

[45] Date of Patent: Aug. 7, 1990

[54] MOVABLE FIBER OPTICAL SWITCH

[75] Inventors: Mindaugas F. Dautartas, Alburtis, Pa.; Yinon Degani, Highland Park, N.J.; Richard T. Kraetsch, Berkeley Heights, N.J.; Richard J. Pimpinella, Hampton, N.J.; King L. Tai, Berkeley Heights, N.J.

[73] Assignee: AT&T Bell Laboratories, Murray Hill, N.J.

[21] Appl. No.: 358,912

[22] Filed: May 30, 1989

[51] Int. Cl.⁵ .............................................. G02B 6/36
[52] U.S. Cl. .............................. 350/96.20; 350/96.13
[58] Field of Search ............... 350/96.13, 96.15, 96.16, 350/96.20, 96.21

[56] References Cited

U.S. PATENT DOCUMENTS

| | | | |
|---|---|---|---|
| 4,204,744 | 5/1980 | Wittmann | 350/96.20 |
| 4,337,995 | 7/1982 | Tanaka et al. | 350/96.20 |

FOREIGN PATENT DOCUMENTS 0111814  9/1981  Japan ............................ 350/96.13

OTHER PUBLICATIONS

Hale et al., Mechanical Optical-Fiber Switch, Electronics Letters, vol. 12, #15, Jul. 22, 1976, p. 388.

*Primary Examiner*—William L. Sikes
*Assistant Examiner*—Akm E. Ullah
*Attorney, Agent, or Firm*—Wendy W. Koba; Michael J. Urbano

[57] ABSTRACT

An m-input/n-output (e.g., 2×2) optical fiber switch is disclosed which alters the location of the fibers by the application of an external force. Illustratively, the switch uses a housing with a diamond-shaped opening extending therethrough, with pairs of optical fibers positioned in orthogonally located V-grooves. Upon the application of an external force, the fibers are moved into the remaining, vacant V-grooves formed by the diamond-shaped opening. In a preferred embodiment, a (2×2) switch is magnetically activated.

34 Claims, 5 Drawing Sheets

4,946,236

MOVABLE FIBER OPTICAL SWITCH

BACKGROUND OF THE INVENTION

1. Field of the Invention

The present invention relates to a movable fiber optical switch and, more particularly, to an m- input/n-output (mxn; e.g., 1×2, 2×1 or 2×2) optical fiber switch.

2. Description of the Prior Art

In evolving optical communications networks, the need often arises to switch an optical signal from one path to another. For example, in a network which consists of a number of communication nodes connected sequentially to form a ring, it may be required to temporarily remove one or more nodes from the network. Therefore, the optical fibers interconnecting the network must be able to "switch" the node(s) from an active (transmit/receive) state to a passive (bypass) state. Many arrangements exist in the art for providing this type of switching. The arrangements may be generally classified into two groups: (1) moving beam switches (arrangements which redirect the optical signal path between stationary fibers); and (2) moving fiber switches (designs which use an external force to physically change the location of the fibers entering and exiting the node). The switch of the present invention falls into the latter category.

There are many arrangements in the prior art for moving an optical fiber so as to effect this switching function. Most of the arrangements utilize the presence or absence of an applied magnetic field to perform the switching. One such device is disclosed in U.S. Pat. No. 4,204,744 issued to J. Wittmann on May 27, 1980. The Wittmann structure is referred to as an one input/two output (1×2) switch, with each fiber being held in place by a V-groove appropriately positioned on a substrate. The substrate is further formed to contain a recessed cavity between the input V-groove and a pair of output V-grooves. A pair of optical fibers are permanently attached to the output V-grooves. An input fiber is placed in the input V-groove and is positioned to extend into the cavity so that the end of the input fiber is free to traverse the cavity from one output V-groove location to the other. A magnetic sleeve fits over the free end of the fiber. An appropriately applied magnetic field will thus cause the fiber to move from one edge of the cavity to the other so as to align it with the chosen output fiber. In this arrangement, alignment is controlled by the ability to accurately position the edges of the cavity with respect to the output V-grooves, but this alignment may prove difficult in some circumstances. Additionally, when this type of 1×2 switch is used in a system for the switching of four fibers, two such switches must be used in tandem. In an optical configuration, the use of two such switches causes a significant increase in the insertion loss at each node, as well adding expense in terms of fiber management.

An alternative arrangement which addresses the latter concern is disclosed in U.S. Pat. No. 4,337,995 issued to T. P. Tanaka et al. on July 6, 1982. This configuration utilizes four separate optical fibers which enter one switch housing, with two fibers being movable within the housing. In the active (transmit/receive) state, all the fibers are stationary; the end-to-end coupling between pairs of fibers allowing for the node to communicate with the ring. Alternatively, when the switching is activated by an applied magnetic field, a pair of fibers move to alternate locations, allowing for the ring to bypass the node.

A problem with both of the discussed arrangements is that the designs are capable of providing only one input/two output (1×2) switching. This limitation is considered to be significant, since situations exist where it would be desirable to perform a (2×2) switching operation. For example, when a particular node is bypassed, an interconnection of the transmitter's output fiber to the receiver's input fiber would allow for self-testing and stand-alone operations to continue to be performed.

Thus, a need remains in the prior art for an optical fiber switch which is capable of performing a (2×2) switching function in addition to a (1×2) switching function.

SUMMARY OF THE INVENTION

The need remaining in the prior art is addressed by the present invention which relates to a movable fiber optical switch and, more particularly, to an m- input/n-output (mxn; e.g., 1×2, 2×1 or 2×2) optical fiber switch.

An exemplary movable fiber optical switch of the present invention utilizes a housing which has an elongated opening extending therethrough. In cross-section the opening may have a variety of geometrical shapes in which flat or curved interior surfaces of the opening define a plurality of grooves in which the fibers may rest. In a coupling region of the housing the fibers are arranged in an end-to-end configuration, and, preferably, no portion of any interior surface of the opening is sufficiently inwardly directed to prevent any fiber from being capable of moving directly from one groove to another groove.

In a preferred embodiment the cross-section has a diamond-shape which defines two pairs of V-grooves which are orthogonal. For a (2×2) switch four separate optical fibers are placed in the housing such that the endfaces of tandem pairs of fibers are optically coupled within the housing. The pairs of fibers are inserted so that they lie in opposed V-grooves. This coupling state may be referred to as the "passive" or bypass state. Switching into the "active" or transmit/receive state is accomplished using an external force which functions to move the fibers to the vacant pair of V-grooves. It is to be noted that the states of the switch may be reversed; that is, the coupling achieved with insertion of the fibers into the housing may be defined as the transmit/receive state and that related to the use of an external force may be defined as the bypass state.

In a (2×1) or (1×2) switch, three separate fibers are placed in grooves of the housing such that the endfaces of one pair are optically coupled in tandem. The external force then functions to move at least one of these two fibers to a different groove such that a different pair is optically coupled in tandem.

In one arrangement of the present invention, the housing may comprise a pair of blocks, each containing a V-groove extending along its length. When the blocks are positioned one on top of the other, the V-grooves mate to form the diamond-shaped opening. In one embodiment, the blocks may be formed of silicon and include etched V-grooves. Alternatively, injection molded piece parts of a suitable material (e.g., plastic) or embossed glass pieceparts may be used.

In accordance with one embodiment of the present invention, magnetic forces are used to hold the fibers in either the "passive" or "active" states. In particular, each fiber is formed to include an appropriately located magnetic sleeve, with permanent magnets located outside of the V-grooves associated with the passive coupling state used to hold the fibers in place. Sections of soft magnetic (e.g., permalloy) material are located at either side of the vacant V-grooves, with gaps between adjacent pieces disposed to align with selected magnetic sleeves. Upon the application of an electrical signal, a magnetic field will be created in the gaps between these soft magnetic pieces. As long as this field is stronger than that of the permanent magnets, the sleeves on the fibers will be attracted to the gaps, moving the fibers into the appropriate vacant V-grooves to provide switching into the "active" transmit/receive state.

In association with the magnetically-activated embodiment of the present invention, the magnetic fiber sleeves may be formed by a variety of techniques, including the formation of a magnetic cylinder which is drawn down to a size slightly greater than the outer diameter of the fibers. The drawn cylinder is then cut into appropriately sized sections and inserted over the ends of the fibers. Alternatively, the sleeves may be formed by plating the magnetic material onto a rod-like form (e.g., wire) with an outer diameter slightly greater than the outer diameter of the fibers. The plated rod may then be cut into sections, and the formed removed using a proper etchant. The resulting sleeves may then be inserted over the fibers.

Other and further aspects of the present invention will become apparant during the course of the following discussion and by reference to the accompanying drawings.

BRIEF DESCRIPTION OF THE DRAWING

Referring now to the drawings, where like numerals represent like parts in several views.

DETAILED DESCRIPTION

Figure 1:
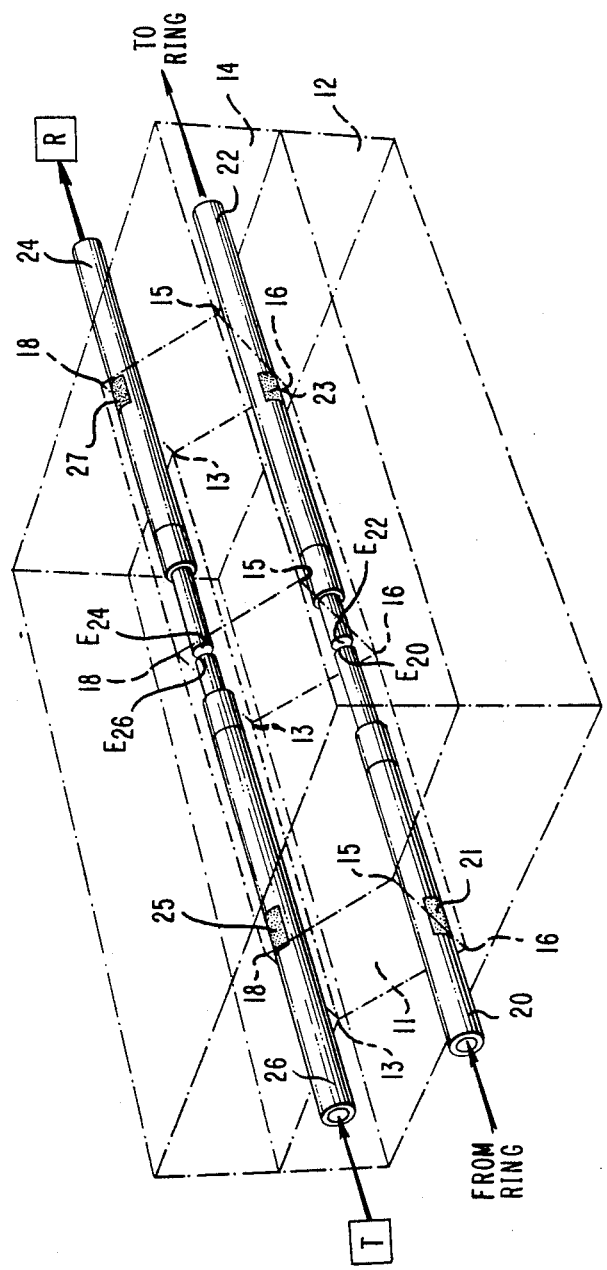
FIG. 1 illustrates a simplied view of an exemplary optical fiber switch of the present invention in a first (e.g., bypass) state.

In accordance with the general aspects of the invention, an optical fiber switch 10, as shown in FIG. 1, includes a housing formed by blocks 12 and 14 with an elongted opening 11 extending completely therethrough. The cross-section of opening 11, taken perpendicular to its elongated dimension, may have a variety of shapes which form a plurality of grooves in which the fibers 20, 22, 24 and 26 may rest. In an interior coupling region of the housing, where fiber pairs are arranged in an end-to-end configuration, the ends of the fibers ($E_{20}$, $E_{22}$, $E_{24}$, $E_{26}$) are free to move, but in an outer region the fibers are typically fixed to the housing (e.g., at 21, 23, 25 and 27). In any particular state of the switch fibers occupy some, but not all, of the grooves in the coupling region; some grooves in the coupling region are vacant to allow fibers to change position therein.

While a variety of cross-sectional shapes of opening 11 are suitable, in general no interior surface portion of the opening in the coupling region should be sufficiently inwardly directed to prevent any fiber from being capable of moving directly from one groove to another groove, in particular to a nearest adjacent groove. Typically, the motion of the fibers involves sliding from one groove to another along one of the interior surfaces of the opening in the coupling region. This configuration is thus markedly different from those taught in the Tanaka et al patent, supra.

Illustrative of a suitable cross-sectional shape is the diamond or rhombic shaped opening of FIG. 1 in which V-grooves 13, 15, 16 and 18 are formed at the intersections of flat interior surfaces. However, curved surfaces (e.g., those convex inwardly toward the elongated axis of the opening) may also be used.

Switches of this type may be employed in general as (m×n) switches depending on the shape of the opening and the concomitant design of the control for moving the fibers. This design may be used, for example, with three fibers in a (1×2) or (2×1) switch, but is most advantageous when employed as a (2×2) switch—the configuration which the prior art has found so difficult to realize in a practical design. Thus, the following example describes a (2×2) switch using a diamond-shaped opening and a magnetic control mechanism.

Referring to FIG. 1, a simplified view of an exemplary (2×2) optical fiber switch 10 is shown. In this view, the switch is defined as being in a first state, which for present purposes will be defined as the "passive" or bypass state. For this particular illustrated embodiment, the housing of switch 10 includes a pair of blocks 12 and 14, block 12 containing a longitudinally-formed V-groove 16 and block 14 containing a longitudinally-formed V-groove 18. Blocks 12 and 14 are positioned one over the other as shown in FIG. 1 such that V-grooves 16 and 18 mate to form a diamond-shaped opening 11 including interface (or vacant) V-grooves 13 and 15. Opening 11 thus runs the length of switch 10. It is to be understood that a single block with an appropriately formed diamond-shaped opening could be used in place of blocks 12 and 14.

As mentioned above, switch 10 of the present invention is classified as a 2×2 fiber switch, which utilizes four separate fibers to provide complete interconnectivity. Referring to FIG. 1, a first pair of fibers 20 and 22 are positioned in an end-to-end relationship along V-groove 16 of block 12. The gap between the ends of the fibers is exaggerated in this view for the sake of illustration. Fibers 20 and 22 are attached along sections 21 and 23, respectively, to groove 16; endfaces $E_{20}$ and $E_{22}$ of fibers 20,22 remaining free to move to provide the necessary switching action. Similarly, a pair of optical fibers 24 and 26 are placed in an end-to-end configuration along V-groove 18 of block 14. Fibers 24 and 26 are attached along sections 25 and 27, respectively, to groove 18; endfaces $E_{24}$ and $E_{26}$ of fibers 24 and 26 remaining free to move to provide the necessary switching action. As will be discussed in detail hereinafter in association with the magnetically-activated embodiment of FIG. 3, all four fibers may be held in these positions by appropriately positioned permanent magnets.

As mentioned above, the particular state of switch 10 as depicted in FIG. 1 may be defined as the "passive" bypass state of switch 10. In that context, fiber 20 will be identified as the fiber entering switch 10 from a communication ring (not shown) and fiber 22 as the fiber exiting switch 10 and re-entering to the ring. To complete the communication system description, fiber 26 may be defined as the fiber attached to an optical transmitting device (labeled as "T" in FIG. 1), and fiber 24 as the fiber attached to an optical receiving device (labeled as "R" in FIG. 1). According to this particular bypass configuration of the present invention, fiber 24 which enters the optical receiving device is coupled to fiber 26 from the optical transmitting device, where this coupling is often very useful. For example, stand-along operation, diagnostic testing, and removal of the unit are all possible as long as these fibers are optically coupled. It is to be noted that the system designations for these fibers are exemplary only, there exist many other applications for a (2×2) optical fiber switch such as that described herein.

As discussed above, an optical fiber switch formed in accordance with the present invention may be switched into the transmit/receive state upon the application of an external force which causes the free endfaces of the fibers in the coupling region to move into the vacant V-grooves. This force may be any type of external force capable of moving adjacent fibers (e.g., fibers 20 and 22) in opposite directions. Preferably the fibers are moved essentially simultaneously. For example, an electrostatic force may be used to accomplish this switching. A vacuum-controlled system may also be implemented. Purely mechanical means may also be used. When considering cost and ease of application, however, a magnetically-activated system is considered to be the preferred alternative, especially the novel design herein which permits a single magnetic control field to effect movement of four fibers in different directions.

Figure 2:
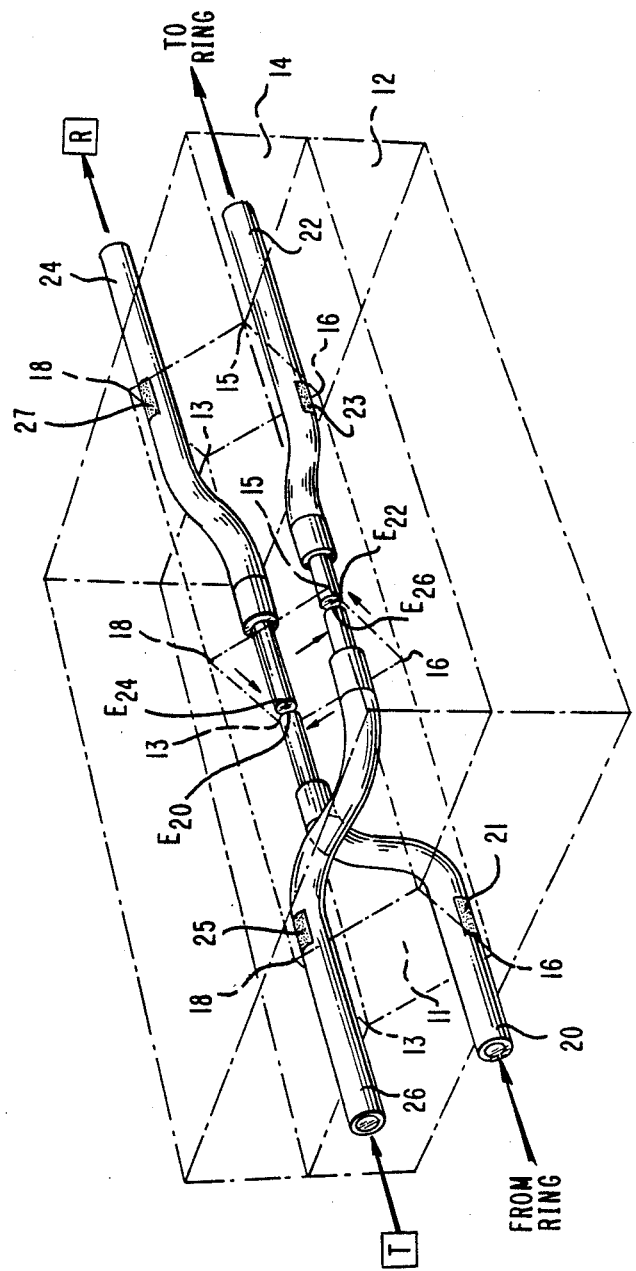
FIG. 2 illustrates a simplified view of an exemplary optical fiber switch of the present invention in a second (e.g., transmit/receive) state.

The transmit/receive state of exemplary switch 10 is illustrated, in simplified form, in FIG. 2, where any of these above-described means of physically moving the fibers may be used. As shown, the free ends of fibers 20, 22, 24 and 26 have been forced to move to interface V-grooves 13 and 15. In particular, the fibers move such that endface $E_{20}$ of fiber 20 is coupled to endface $E_{24}$ of fiber 24 along interface V-groove 13, and endface $E_{22}$ of fiber 22 is coupled to endface $E_{26}$ of fiber 26 along interface V-groove 15. Therefore, the optical signal entering switch 10 from the ring along fiber 20 will be directly coupled via fiber 24 into an optical receiver R. Additionally, the optical output signal from transmitter T will travel along fiber 26 and be coupled into fiber 22 for insertion into the communication ring. In this mode, user equipment (e.g., a computer) connected to the node where switch 10 is located is able to communicate with other equipment connected to the ring.

Figure 3:
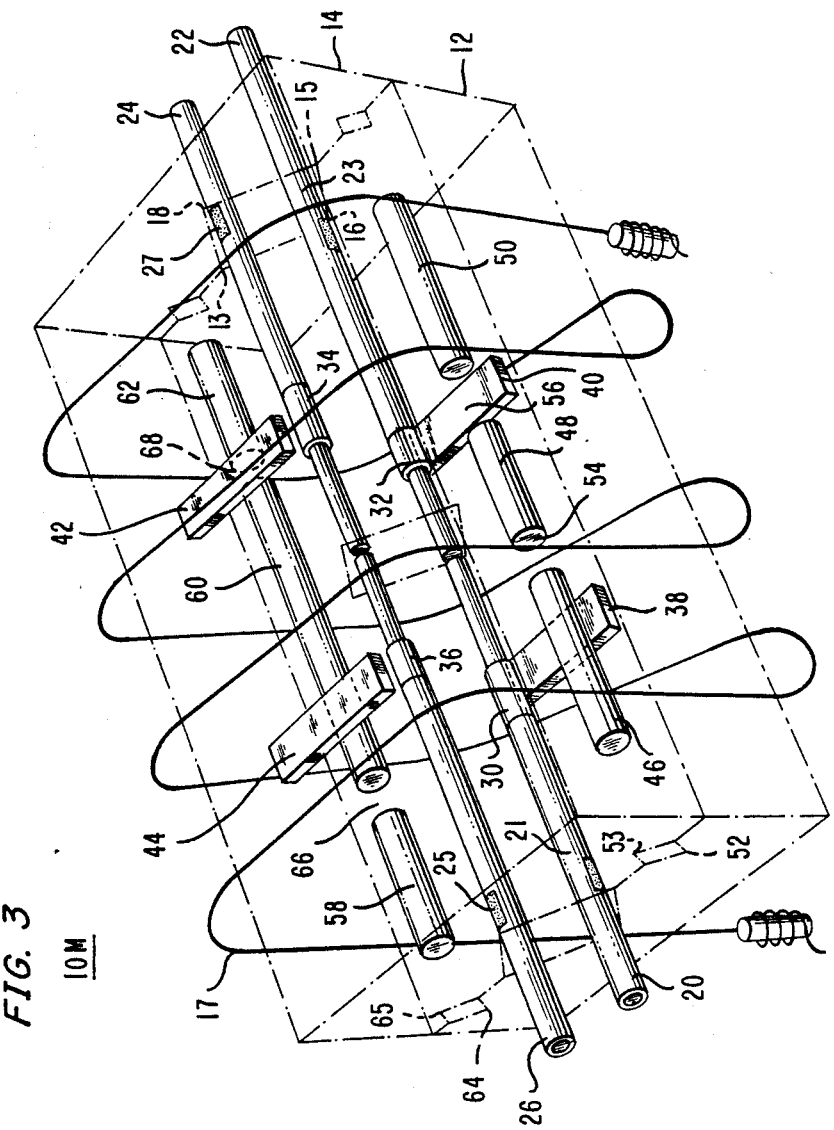
FIG. 3 contains a perspective view of an exemplary (2×2) optical fiber switch formed in accordance with the present invention.

The movement of the optical fibers to this alternative (e.g., transmit/receive) configuration of switch 10 is preferably accomplished, as discussed above, by the application of a single magnetic field of a strength sufficient to overcome the force of a set of permanent magnets which are used to releasably hold the fibers in the bypass state. A detailed illustration of a magnetically activated switch $10_M$, is illustrated in FIG. 3. As shown, each fiber includes a magnetic sleeve portion, which is fit over the fiber cladding and located at an appropriate position along the length of each fiber. The magnetic sleeve may comprise, for example, a combination of 80% nickel and 20% iron. Other combinations (or other materials) may also be used. Various exemplary methods of forming these sleeves will be discussed in detail hereinafter. In one embodiment, a portion of the outer protective coating of the optical fibers may be removed so as to expose the free end of the fibers back to the location of the magnetic sleeves. Therefore, the portion of the fiber beyond the sleeve will be a stripped optical fiber (cladding and core). Since the outer diameter of the stripped fiber is carefully controlled during formation, the end-to-end coupling of stripped optical fibers is considered to provide increased accuracy in alignment when compared to an end-to-end coupling of fibers which include the outer protective coating.

Referring to FIG. 3, fiber 20 includes a magnetic sleeve 30, fiber 22 a sleeve 32, fiber 24 a sleeve 34, and fiber 26 a magnetic sleeve 36. As discussed above in association with FIG. 1, permanent magnets are utilized to hold the fibers in the passive bypass state. Switch $10_M$ of FIG. 3 is shown as including four such magnets 38, 40, 42 and 44. In particular, a first permanent magnet 38 is positioned below V-groove 16 so as to lie underneath sleeve 30 of fiber 20. A second magnet 40 is similarly positioned with respect to sleeve 32 of fiber 22. In a similar manner, a pair of permanent magnets 42 and 44 are positioned above V-groove 18 so as to be above magnetic sleeves 34 and 36, respectively. Alternatively, a single, larger magnet may be used in place of magnet pins 38,40 and 42,44. It is to be noted that these magnets may be attached to the outside of blocks 12 and 14, may be embedded within the material forming blocks 12 and 14, or may be formed on one or more interior surfaces of the V-grooves.

As mentioned above, switching into the alternate (e.g., transmit/receive) state of switch $10_M$ is accomplished by the use of appropriately placed soft magnetic (e.g., permalloy) pieces in conjunction with an applied electrical signal which propagates along a coil 17 encircling switch $10_M$. In one particular configuration, as illustrated in FIG. 3, the soft magnetic pieces take the form of rods 46, 48, 50 and 58, 60, 62 which are disposed in V-grooves formed parallel to fiber-holding V-grooves 16 and 18. As shown, a first set of soft magnetic pieces 46, 48 and 50 are positioned within a first V-groove 52 located adjacent to interface (vacant) V-groove 15 of opening 11. The pieces are disposed such that gaps 54 and 56 between the adjacent pieces are substantially aligned with magnetic sleeves 36 and 32. Therefore, upon application of an electrical signal to coil 17, a magnetic field will be created in the gaps, causing sleeves 36 and 32 to be attracted to gaps 54 and 56, respectively. Thus, free ends $E_{26}$, $E_{22}$ of fibers 26 and 22 will move to occupy interface V-groove 15 such that optical coupling is achieved. In association with the system description of FIGS. 1 and 2, the coupling of fibers 22 and 26 may serve to connect the fiber entering the optical transmitter (fiber 26) to the fiber re-entering the communication ring (fiber 22).

In a similar manner, a second set of soft magnetic pieces 58, 60 and 62 are positioned adjacent to interface (vacant) V-groove 13 of opening 11, where pieces 58, 60 and 62 may be disposed in a second V-groove 64. Pieces 58, 60 and 62 are placed in the same configuration as the pieces discussed above, so as to form a pair of gaps 66 and 68. Gaps 66 and 68 are positioned to substantially align with magnetic sleeves 30, 34 of fibers 20 and 24, respectively. Upon application of an electrical signal, therefore, free ends $E_{20}$, $E_{24}$ of fibers 20 and 24 will move to occupy interface V-groove 13. This arrangement provides optical coupling between the fiber entering the switch from the ring (fiber 20) and the fiber entering the optical receiver (fiber 24).

In summary, therefore, the application of a sufficient voltage will cause switch $10_M$ to move all four optical fibers from the passive bypass state to the active transmit/receive state. It is to be noted that a switch which functions in the oppsite manner may also be formed. That is, the coupling provided by the permanent magnets may be defined as the active state, and the coupling achieved by the application of an electrical signal defined as the passive state. However, the arrangement as illustrated in FIGS. 1 and 2 is preferred, since the bypass state requires no application of power. Therefore, if a particular node were to experience a power failure, no harm to the communication ring would result, since that particular node would not be active. If the opposite configuration were to be used, with an applied force required to bypass the node, a power failure at the node would cause the switch to reside in the transmit/receive state, without the ability for the node to provide communication.

As mentioned above, there are a variety of techniques for forming the magnetic sleeves which cover end portions of each fiber in the magnetically-activated configuration. Two different techniques are particularly suited for this application. In a first method, a cylindrical rod having a sacrificial core of an etchable material (e.g., Cu) and a coating of a second material (e.g., an 80%-20% by weight combination of iron and nickel) is formed. As made, the rod has an inner diameter of the second material which is substantially larger than the outer diameter of a typical stripped optical fiber (e.g., outer diameter=125 $\mu$m). The rod is subsequently heated and drawn down to a size such that its inner diameter is just slightly larger than the stripped fiber's outer diameter. The rod is then cut into pieces of a length appropriate for this application. The cores are etched away, and the pieces are then fit over the free ends of the fiber, and and secured in appropriate locations (using an epoxy, for example) to form a magnetic sleeves. In an alternative method, the material used to form the sleeves is coated (or plated) onto a cylindrical form, where the form has an outer diameter substantially indentical to that of the stripped optical fiber. In one embodiment, the form may comprise a copper wire. Once the coating operation is completed, the structure is cut into sections of appropriate length. The form may be removed with an etchant which will not attack the coating material (for example, a commercially available etchant such as Metex ® of MacDermid, Inc. may be used with a copper wire form). The cylindrical sections are then attached as described above to form the magnetic sleeves.

Figure 4:
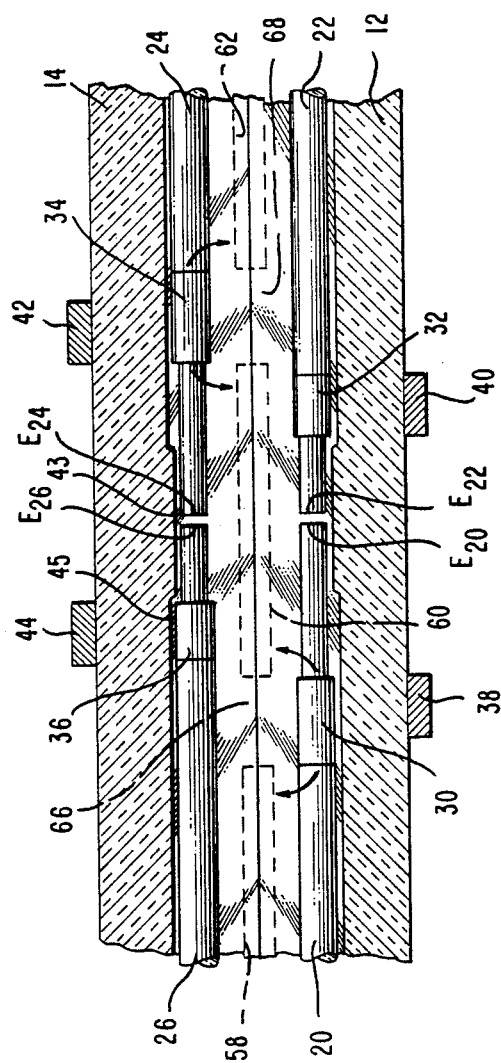
FIG. 4 illustrates a simplified cross-sectional view of FIG. 3 taken through the elongated axis of the opening.

A simplified view of the exemplary magnetically-activated optical fiber switch $10_M$ of FIG. 3 is illustrated in FIG. 4. This particular view illustrates the movement of a pair of fibers in response to the induced magnetic field. Soft magnetic pieces 58, 60 and 62 are shown, with the relationship between gaps 66, 68 and magnetic sleeves 30, 34 clearly visible. In order to be able to move each of the four fibers to selected V-grooves with a single magnetic control field, the gaps and the sleeves are staggered axially along the opening. Thus, sleeves 30 and 34 are aligned with gaps 66 and 68, respectively, but not with sleeves 32 and 36. As a consequence, sleeves 32 and 36 are located closer to endfaces $E_{22}$ and $E_{26}$ than sleeves 30 and 34 are located with respect to endfaces $E_{20}$ and $E_{24}$, respectively. Since the fibers are, in effect, held in a cantilevered arrangement with the force being applied at the sleeves, the lever arms associated with fibers 20 and 24 are shorter than those associated with fibers 22 and 26. Thus, for a given field strength, the sleeves 30 and 34 are made longer than sleeves 32 and 36 so that all four fibers experience approximately the same torque. In one embodiment sleeves 32 and 36 were 100 mils long whereas sleeves 30 and 34 were 140 mils long.

As described above, upon the application of an electrical signal, a magnetic field will form in gaps 66 and 68, causing sleeves 30 and 34 of fibers 20 and 24 to move in the directions indicated by the arrows. The movement of sleeves 30, 34 thus causes free ends $E_{20}$, $E_{24}$ of fibers 20 and 24 to move into interface V-groove 13 so as to provide optical coupling therebetween. The application of this electrical signal also causes free ends $E_{22}$, $E_{26}$ of fibers 22 and 26 to move into interface V-groove 15.

Another feature of the invention, which is particularly advantageous from an alignment standpoint, is also depicted in FIG. 4; that is, the cross-section of the diamond-shaped opening is slightly smaller in the coupling region 43 where the fibers endfaces are arranged end-to-end. In this region, the bare cladding of the fibers actually touches the sides of the V-grooves. Since the diameter of the bare fiber is precisely controlled, alignment is facilitated. On the other hand, in the region 45 adjacent to coupling region 43, the coated fibers (and hence the sleeves) do not touch the sides of the V-grooves; they float. This design means that the outer diameter of each sleeve does not have to be precisely machined.

Figure 5:
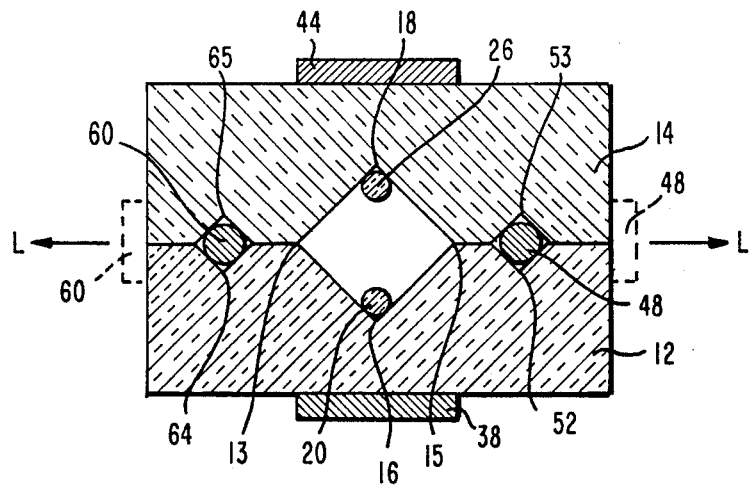
FIG. 5 is a simplified cross-sectional view taken through one of the magnets (e.g., 42 or 44) of the switch configuration of FIG. 3 when in the first state.
Figure 6:
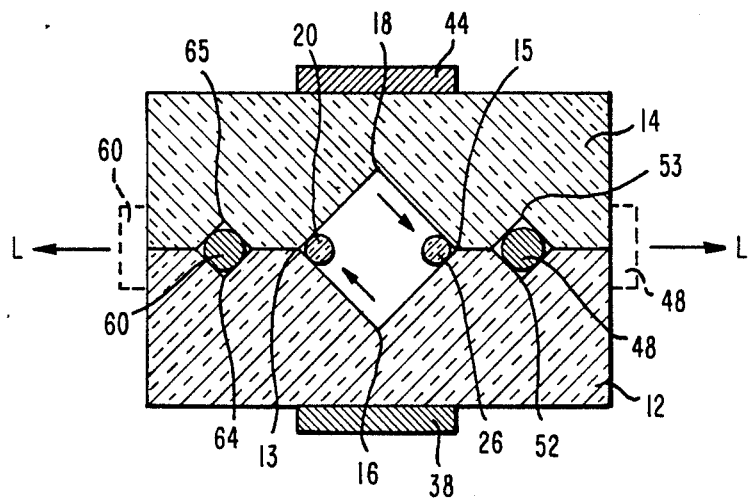
FIG. 6 is a simplified cross-sectional view in the second state of the switch configuration illustrated in FIG. 5.

As mentioned above, in one embodiment the soft magnetic pieces may be positioned in small V-grooves formed on either side of interface V-grooves 13 and 15. FIG. 5, a cross-sectional view taken through one of the magnets (e.g., 44) of FIG. 3, illustrates an exemplary switch containing these grooves. In this particular arrangement, the switch is defined as being in the passive (bypass) state, with endfaces $E_{20}$, $E_{26}$ of fibers 20 and 26 residing in V-grooves 16 and 18, respectively. Soft magnetic piece 48 is illustrated as positioned within V-groove 52 formed in block 12. Depending upon the shape of the soft magnetic pieces, a mating V-groove 53, formed in block 14, may be required to accommodate the pieces. This will be the case when the pieces are in the form of rods, as depicted here. Similarly, soft magnetic piece 60 is illustrated as disposed between a pair of mating V-grooves 64 and 65. To be complete, FIG. 6 contains a cross-sectional view illustrating the active (transmit/receive) configuration of this particular switch. Here, endfaces $E_{20}$, $E_{26}$ of fibers 20 and 26 are shown as residing in interface V-grooves 13 and 15, respectively. It is to be understood that the soft magnetic pieces may be positioned anywhere along the line L shown in FIGS. 5 and 6. In particular, the pieces could conceivably be attached to the outer walls of the switch, as illustrated in phantom in FIGS. 5 and 6. In general, the proximity of the soft magnetic pieces to the magnetic sleeves will affect only the strength of the applied magnetic field necessary to perform the switching.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, while the magnetic control arrangement described above is preferred, it is not essential; other designs are possible.

In addition, the optical fiber switch of our invention may be employed as an on-off switch between, for example, a pair of fibers or as an optical attenuator in which, in a first position the fibers are coupled with a first level of transmission and in a second position the fibers are coupled with a second, different level of transmission. This feature may be used in straightforward attenuator applications or in the bypass mode of an optical fiber switch where the user equipment transmits to itself ( a self-testing feature) but at much reduced, non-zero optical power levels.

We claim:

1. An optical fiber switch for providing coupling between a first optical fiber and at least a second optical fiber when in a first state and a third optical fiber when in a second state, the switch comprising a housing having an elongated opening extending completely therethrough and a coupling region wherein the fibers are disposed in end-to-end relationship, the interior surfaces of said opening forming a plurality of grooves, no portion of said surfaces being sufficiently inwardly directed in said coupling region to prevent said at least one of said fibers from being capable of moving directly from one groove to an adjacent groove, with said first and second optical fibers capable of being disposed in said coupling region in an end-to-end configuration along a first groove, and said first and the third optical fibers capable of being disposed in said coupling region in an end-to-end configuration along a second groove, this disposition of said first and second fibers being utilized to achieve the first state of said switch and that of the first or third fibers being utilized to achieve a second state of said switch, holding means for releasably maintaining the optical fibers in said first state;

moving means for physically moving said at least one fiber in said coupling region between said first and second grooves such that said second state of said switch is achieved.

2. The optical fiber switch of claim 1 wherein the cross-section of said opening, taken perpendicular to the elongated dimension of said opening, is essentially diamond-shaped.

3. The optical fiber switch of claim 2 wherein said moving means causes said at least one fiber to slide along one of said interior surfaces in said coupling region between said first and second grooves.

4. An optical fiber switch for providing coupling from a first optical fiber to a second optical fiber and from a third to a fourth optical fiber when in a first state, and from the first to the fourth and the second to the third optical fiber when in a second state, the switch comprising a housing having an elongated opening extending completely therethrough and a coupling region wherein the fibers are disposed in end-to-end relationship, the interior surfaces of said opening forming a plurality of grooves and no portion of said surfaces being sufficiently inwardly directed in said coupling region to prevent any one of said fibers from being capable of moving directly from one groove to an adjacent groove, with the first and second optical fibers capable of being disposed in said coupling region in an end-to-end configuration along a first groove, and the third and fourth optical fibers capable of being disposed in said coupling region in an end-to-end configuration along a second groove so as to achieve the first state of said switch;

holding means for releasably maintaining the optical fibers in said first state;

moving means for physically moving at least the ends of the optical fibers in said coupling region into different grooves formed by said opening, said moving means capable of positioning said fibers such that said second state of said switch is achieved.

5. The optical fiber switch of claim 4 wherein the cross-section of said opening, taken perpendiclar to the elongated dimension of said opening, is essentially diamond-shaped forming opposing pairs of V-grooves, wherein in the first state the first and second fibers are disposed in said coupling region in a first groove, the third and fourth fibers are disposed in said coupling region in a second groove, and the third and fourth grooves in said coupling region are vacant, and wherein in the second state the first and fourth fibers are disposed in the previously vacant third groove, thereby coupling the first fiber to the fourth fiber, and the second and the third fibers are disposed in the previously vacant fourth groove, thereby coupling the second fiber to the third fiber.

6. The optical fiber switch of claim 5 wherein said moving means causes said fibers to slide along the interior surfaces of said opening in said coupling region to effect a change of state from said first to said second state and conversely.

7. An optical fiber switch for providing coupling from a first optical fiber to a second optical fiber and from a third to a fourth optical fiber when in a first state, and from the first to the fourth and the second to the third optical fiber when in a second state, the switch comprising a housing having a diamond-shaped opening extending completely therethrough, said diamond-shaped opening defining opposing pairs of V-grooves, with the first and second optical fibers capable of being disposed in an end-to-end configuration along a first V-groove, the third and fourth optical fibers capable of being disposed in an end-to-end configuration along a second, opposing V-groove, this disposition being utilized to achieve the first state of said switch;

holding means for maintaining the optical fibers in said first state;

moving means for physically moving the optical fibers into the vacant V-grooves formed by said diamond-shaped opening, said moving means capable of positioning said fibers such that said second state of said switch is achieved.

8. The optical fiber switch of claim 7 wherein the switch is magnetically activated and comprises a set of magnetic sleeves, each sleeve appropriately located on an associated optical fiber;

the holding means comprises a plurality of permanent magnets positioned to substantially align with said magnetic sleeves; and the moving means comprises a plurality of soft magnetic pieces disposed on either side of the vacant V-grooves, said soft magnetic pieces disposed so as to form gaps therebetween which substantially align with selected magnetic sleeves; and means for providing a magnetic field in the gaps between said plurality of soft magnetic pieces such that selected magnetic sleeves will be attracted to the appropriate gaps and the fibers moved to the vacant V-grooves so as to provide the second state of said switch.

9. The optical fiber switch of claim 8 wherein said sleeves are of different lengths and are positioned at different axial locations along said fibers, shorter sleeves being positioned closer to the ends of the fibers on which they formed and longer sleeves being positioned farther from the ends of the fibers on which they are formed.

10. An optical fiber switch as defined in claim 8 wherein the means for providing a magnetic field comprises an electrical wire disposed in a coil-like configuration to surround the housing; and signal source means for application of an electrical current to said sire, said current being sufficient to overcome the attraction between the permanent magnets and the magnetic sleeves.

11. An optical fiber switch as defined in claim 8 wherein the plurality of permanent magnets are disposed on the outer surface of the housing.

12. An optical fiber switch as defined in claim 8 wherein the plurality of permanent magnets are disposed within the housing.

13. An optical fiber switch as defined in claim 8 wherein the plurality of permanent magnets comprises a first permanent magnet substantially aligned with the magnetic sleeve of said first fiber;

a second permanent magnet substantially aligned with the magnetic sleeve of said second fiber;

a third permanent magnet substantially aligned with the magnetic sleeve of said third fiber; and a fourth permanent magnet substantially aligned with the magnetic sleeve of said fourth fiber.

14. An optical fiber switch as defined in claim 8 wherein the plurality of soft magnetic pieces comprises a first set of three soft magnetic pieces linearly disposed so as to form a pair of gaps therebetween, the first gap substantially aligned with the magnetic sleeve on the first fiber and the second gap substantially aligned with the magnetic sleeve on the fourth fiber; and a second set of three soft magnetic pieces linearly disposed so as to form a pair gaps therebetween, the first gap substantially aligned with the magnetic sleeve on the third fiber and the second gap substantially aligned with the magnetic sleeve on the second fiber.

15. An optical fiber switch as defined in claim 8 wherein the plurality of soft magnetic pieces comprises permalloy rods.

16. An optical fiber switch as defined in claim 15 wherein the permalloy rod pieces are disposed in V-grooves formed in the housing adjacent to the fiber-holding grooves.

17. An optical fiber switch as defined in claim 8 wherein the plurality of soft magnetic pieces are disposed within the housing.

18. An optical fiber switch as defined in claim 8 wherein the plurality of soft magnetic pieces are attached to the outer surface of said housing.

19. The optical fiber switch as defined in claim 8 wherein the plurality of soft magnetic pieces are formed on at least one internal surface of said opening.

20. An optical fiber switch as defined in claim 8 wherein the magnetic sleeves comprise a soft magnetic material including nickel and iron.

21. An optical fiber switch as defined in claim 20 wherein the magnetic sleeves comprise approximately of 80% nickel and 20% iron.

22. An optical fiber switch as defined in claim 8 wherein the magnetic sleeves comprise cylindrical sections which have been drawn down from a cylinder, where upon drawing the inner diameter of the cylinder is slightly larger than the outer diameter of the optical fibers, the drawn cylinder being cut into small sections to form the magnetic sleeves.

23. An optical fiber switch as defined in claim 8 wherein the magnetic sleeves comprise cylinders which have been formed as a coating of magnetic material on a core member having an outer diameter substantially identical to the outer diameter of the optical fibers, the coated core member being cut into small sections, and the core member of each section being removed by an etching operation to form the magnetic sleeves.

24. An optical fiber switch as defined in claim 23 wherein the core member comprises a copper wire.

25. An optical fiber switch as defined in claim 7 wherein the housing comprises silicon.

26. An optical fiber switch as defined in claim 25 wherein the V-grooves are formed by anisotropically etching the silicon housing.

27. An optical fiber switch as defined in claim 7 wherein the housing comprises injection molded piece parts.

28. An optical fiber switch as defined in claim 27 wherein the housing comprises plastic injection molded piece parts.

29. An optical fiber switch as defined in claim 7 wherein the housing comprises embossed glass parts.

30. An optical fiber switch as defined in claim 7 wherein the housing comprises a first block member containing a longitudinal V-groove extending completely therethrough for holding the first and second optical fibers in an end-to-end configuration when the switch is in the first state; and a second block member containing a longitudinal V-groove extending completely therethrough for holding the third and fourth optical fibers in an end-to-end configuration when the switch is in the first state, the second block positioned over the first block such that the longitudinal V-grooves mate to form the diamond-shaped opening extending through said housing.

31. An optical switch comprising a housing having an opening extending therethrough, a first optical fiber disposed in said opening, said first fiber being affixed to said housing at at least one point along said fiber and having a first end free to move, a first magnetic member located in or on said first fiber near to said first free end, permanent magnet means for providing a first magnetic field for interacting with said first magnetic member to generate a first force to releasably hold said first free end of said first fiber in a first position in said opening, a plurality of soft magnetic pieces arranged in tandem with at least one gap between two adjacent ones of said pieces, said at least one gap being in registration with said first magnetic member, and means for generating a second magnetic field which interacts with said magnetic pieces to overcome said first force and to move said first free end of said first fiber to a second position within said opening.

32. An optical fiber switch as defined in claim 31 further comprising a second optical fiber disposed in said opening, said second fiber having a second end coupled to said first end of said first fiber with a first level of transmission in said first position and being coupled to said first fiber with a second, different level of transmission in said second position.

33. An optical fiber switch as defined in claim 32 wherein said first and second fibers are essentially completely decoupled in said second position.

34. An optical fiber switch as defined in claim 32 further comprising at least third and fourth optical fibers disposed in said opening, said second, third and fourth fibers being affixed at at least one point along each of said fibers to said housing and having second, third and fourth ends free to move, second, third and fourth magnetic members located on or in said second, third and fourth fibers at different positions along the lengths thereof, at least two of said four members having lengths different from the remaining two according to the lever arms defined by the distance between said members and the point where they are affixed to said housing, said plurality of soft magnetic pieces having at least four gaps in registration with separate ones of said members, said permanent magnet means providing second, third and fourth magnetic fields for interacting with said magnetic members to generate forces to releasably hold each of said free ends of said fibers in a different first position, and said generating means for overcoming the forces generated by said permanent magnet means to move the free ends of said fibers to different second positions.

* * * * *